United States Patent Office 3,302,590
Patented Feb. 7, 1967

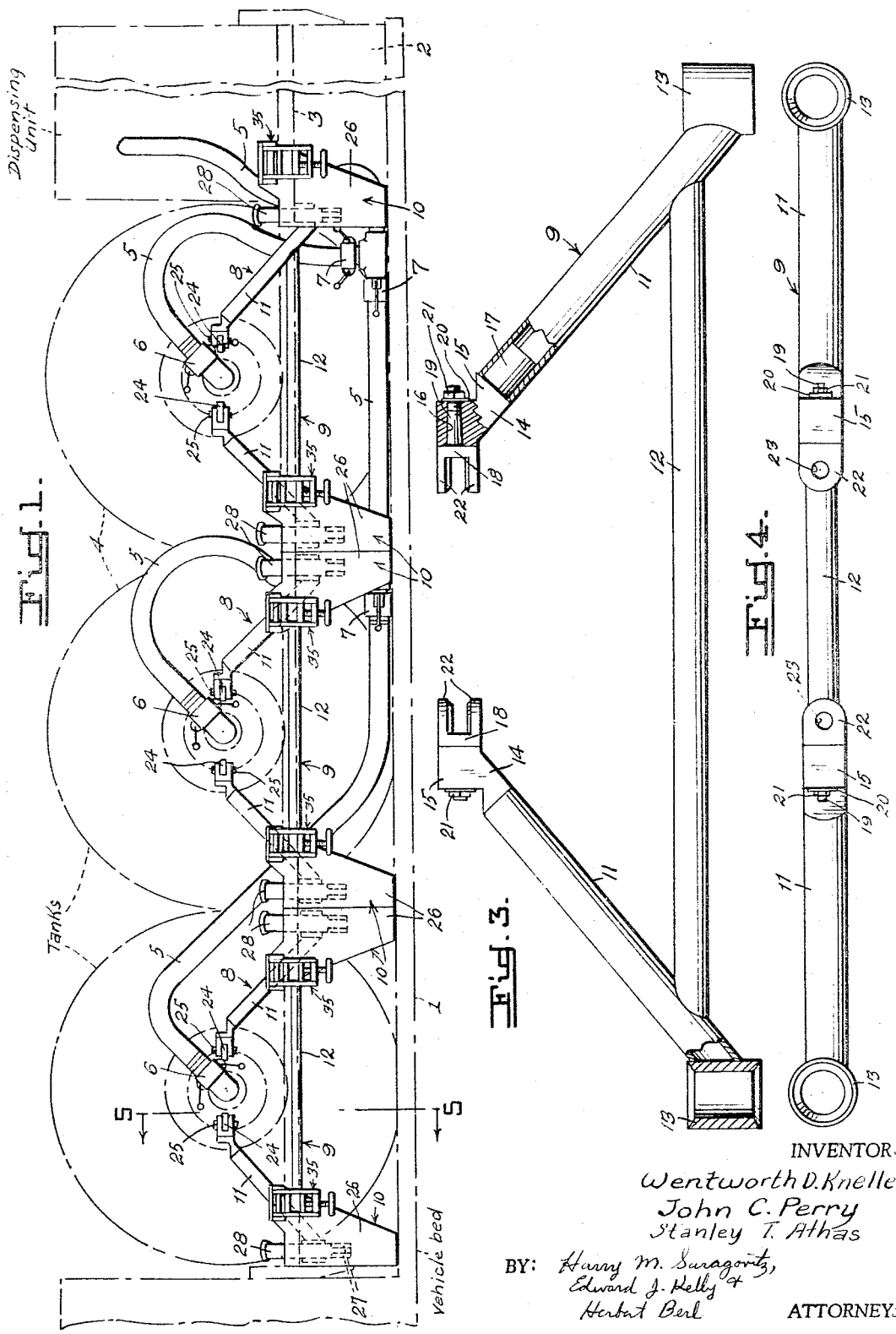

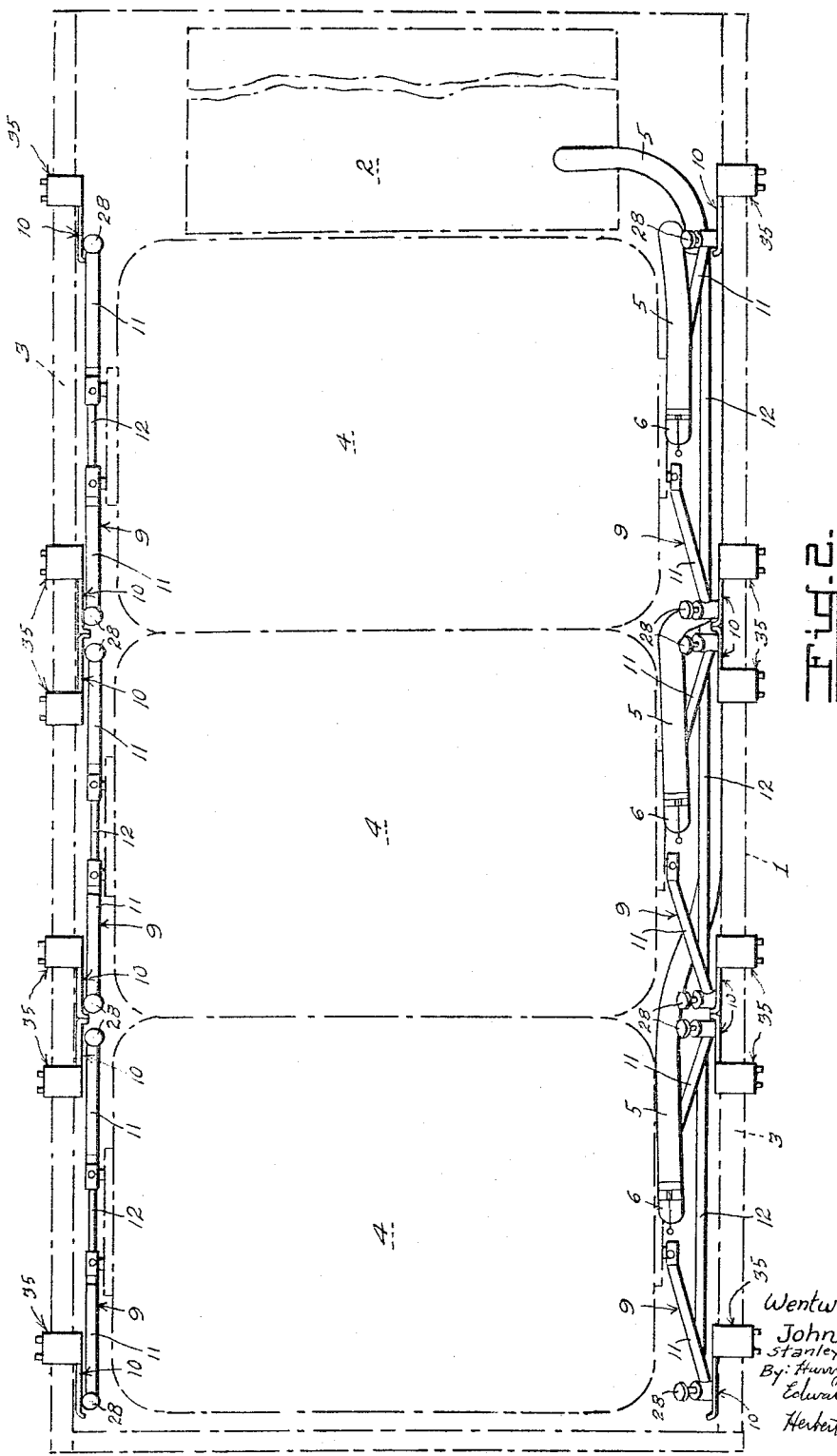

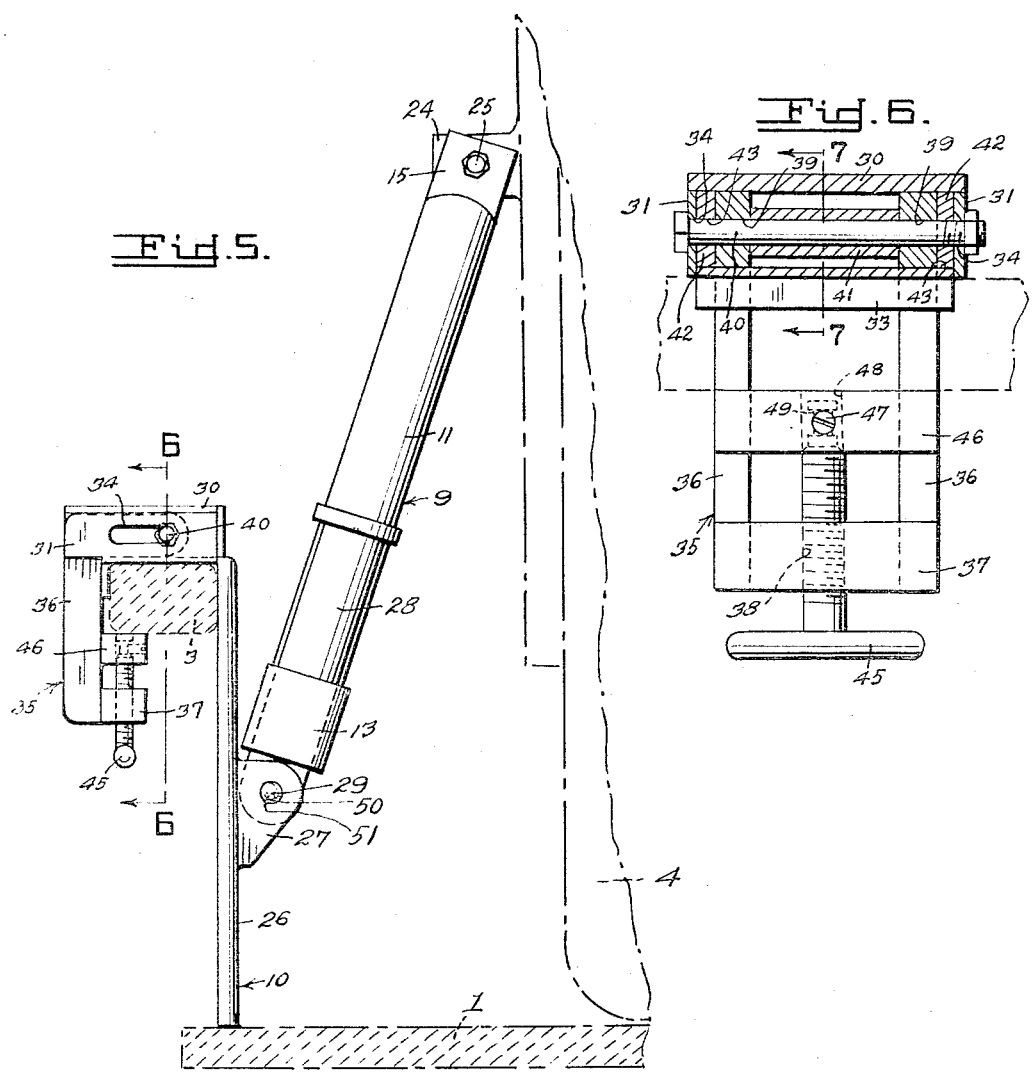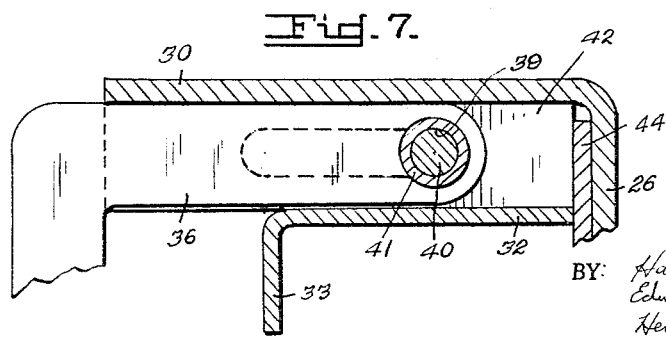

3,302,590
TIE-DOWN ASSEMBLY
Wentworth D. Kneller, Levittown, Pa., and John C. Perry, Sherborn, and Stanley T. Athas, Lowell, Mass., assignors to the United States of America as represented by the Secretary of the Army
Filed Apr. 29, 1965, Ser. No. 452,036
3 Claims. (Cl. 105—367)

This invention relates to a tie-down assembly and more particularly to a hold-down means for gasoline containers on flat bed vehicles, the containers being lightweight, 500 gallon tanks. The tanks are transported, side by side, on a vehicle having a flat bed such as a truck, railroad flat car, etc.

The present invention provides a one piece frame assembly, pivotally mounted to side plates detachably secured on the vehicle's sides and to the ends of the tanks. The assembly is interchangeable on either side of the tanks and permits the tanks to be positioned from side to side within the vehicle as is expedient for providing space between the tanks and the vehicle sides for hose and hose coupling for connecting the tanks to a dispensing unit at one end of the vehicle.

It is therefore a principal object of this invention to provide a tie-down assembly for restraining fuel tanks on the bed of a vehicle.

Another object is to provide a tie-down assembly interchangeable on either side of the tanks.

A further object is to provide a basic tie-down frame assembly, simple of construction and versatile in use.

A final object is to provide a tie-down frame assembly pivotal at one of its ends to side brackets and at its other end to a tank whereby the tank can be moved away from the side bracket as desired.

The specific nature of the invention as well as other objects and advantages thereof, will clearly appear from a description of a preferred embodiment as shown in the accompanying drawings in which:

FIG. 1 is a somewhat schematic side view of the tie-down assembly in use, the vehicle bed, side rail and tanks being shown in broken lines;

FIG. 2 is a somewhat schematic top plan view thereof;

FIG. 3 is a side elevation of the frame assembly with parts in section;

FIG. 4 is a top plan view thereof;

FIG. 5 is a sectional view taken along lines 5—5 of FIG. 1;

FIG. 6 is a sectional view taken along lines 6—6 of FIG. 5; and,

FIG. 7 is a detail section taken along lines 7—7 of FIG. 6.

Referring now to the drawings, reference character 1 denotes the bed of a vehicle. A dispensing unit is indicated by 2. A side rail is indicated by 3 and tanks carried by bed 1 are indicated by 4.

A manifold system leads from tanks 4 to the dispensing unit 2 and consists of hose 5 which are connected to tanks 4 by couplings 6 and to one of the hose 5 by couplings 7.

Three tie-down assemblies are shown in FIG. 1 and these assemblies are each represented generally by 8.

All assemblies, on either side of the tanks 4 are identical. Each assembly consists of three main components, frame elements indicated generally by 9, a pair of brackets 10 and a pair of yokes 14. The frame 9 is pivotally connected to the brackets 10 and to the tanks 4 as shown.

Each frame 9 is substantially A-shaped and consists of two diagonal tubes 11 (see FIG. 3), a horizontal support tube 12, and two vertical guides 13, one guide each, being at the lower end of each diagonal support tube 12.

Guides 13 are also tubular. The tubes 11, 12 and 13 form a unitary weldment.

Yoke assemblies 14 are mounted in the upper ends of the diagonal tubes 11 of frame 9. The yoke assemblies 14 are identical and each consists of an adapter 15 which is provided with a tapered horizontal bore 16 and a cylindrical stud 17 which is received in the upper end of tube 11 and welded thereto.

A yoke 18 is designed for the pivotal connection of the frame 9 to tanks 4 and comprises an integral, externally threaded, tapered bolt portion 19 which is rotatably received in bore 16 and is retained therein by a washer 20 and nut 21. A pair of integral ears 22 completes the yoke 18 and are bored as at 23. Ears 22 are connected to lugs 24 on the end of tanks 4 and are retained by bolts 25.

The brackets 10 constitute either a left hand or a right hand unit. Each bracket comprises a flat plate 26 (see FIGS. 5, 6 and 7) which is provided with a pair of bored ears 27 integral with its inner side and which are adapted to receive the lower end of a pin 28 which is slidably received in tube 13. The lower end of the pin is pivotally received in ears 27 and retained therein by a bolt 29.

Plate 26 is provided with an outwardly extending lip 30 which forms the top side of a box-like structure having side walls 31 and a floor 32. The aforesaid elements are welded together. The floor is provided with a downwardly turned lip 33. Side walls 31 are each provided with an elongated slot 34.

Means are provided for supporting the brackets on rail 3 or similar vehicle sides and consist of a locking arm generally indicated by 35. The locking arm 35 consists of a pair of spaced angle members 36. Members 36 are held spaced by a block 37 welded to their inner sides. Block 37 is provided with an internally threaded central bore 38. The upper ends of members 36 are provided with bores 39 which receive a bolt 40 which also passes through slots 34 in side walls 31. A tubular spacer 41 encircles bolt 40 between the members 36.

Reinforcing members 42 are provided on the inside of walls 31 and are also slotted as at 43 to coincide with slots 31 and permit bolt 40 to slide therein. Another reinforcing strip 44 is provided on the inner side of plate 25 as shown in FIG. 7.

An externally threaded handle 45 is provided and is threadably engaged in threaded bore 38. A clamp 46 is secured by a set screw 47 to the upper end of handle 45 which is received in a bore 48 in clamp 46. A reduced portion 49 in handle 45 receives set screw 47 to permit retention of the handle in bore 48 and to also permit rotation of the handle therein.

In assembly, the tanks 4 are arranged side by side on the bed 1 of the vehicle. The tanks 4 are coupled to a hose manifold system 5, 6 which leads to the dispensing unit 2. The manifolding system 5 is arranged on one side of the tanks, as shown in FIGS. 1 and 2.

The vehicle is provided with the usual sides, or as shown, rails 3. Four bracket assemblies 10 and two frames 9 are used to tie down each tank. Two bracket assemblies 10 will be left hand units and two will be right hand. The bracket assemblies 10 are clamped to the vehicle's side or side rail 3 by locking arms 35 which are clamped thereto by placing the flat plate 26 close to rail 3 with the locking arm 35 thereover. The handle 45 is then turned to cause clamp 46 to grip rail 3 and secure the assembly 10 fast thereto. Slots 34, 43 permit sliding adjustment of the locking arm 35 to be moved in or out for sliding clamp 46 under rail 3 or removal from thereunder.

The frame 9 may be attached to assemblies 10 either before or after clamping them to rail 3. To assemble the frames 9 to a plate 26, the pin 28 is passed through tube 13 and the lower part thereof, being bored, as at 50 is aligned with a bore 51 in ears 27 and a bolt 29 is passed therethrough. The upper ends of frame 9 is likewise attached to lugs 24 on tanks 4.

The frame assemblies 9 being pivoted at each end and the yoke 18 being rotatable, allowance is made for any sidewise movement of tanks 4 to compensate for space needed for the manifold 5, but at all times the tanks 4 are hold fast to the vehicle bed 1.

The tie-down of the invention can be used to secure similar cargoes and its use is unlimited. The tie-down is relatively light and is quickly assembled or detached.

Variations and modifications may be effected without departing from the scope of the novel concept of the present invention as set forth in the appended claims.

What is claimed is:

1. A tie-down assembly for the securement of a series of side-by-side arranged containers on the bed of a vehicle having sides including in combination; a pair of spaced, opposite-hand bracket assemblies detachably secured on each side of the vehicle and opposite the ends of each container, and a frame assembly pivotally connected at one of its ends to a container and at its other end to a bracket assembly; each said bracket comprising a flat plate having a pair of bored ears integral with its inner side for pivotal attachment to said frame, said plate having an outwardly extending lip at its upper edge, a pair of side walls and a top wall fixed to said lip, there being an elongated slot in each said side wall and in alignment with each other; and a clamping means having a bolt extending on both sides thereof to ride in said elongated slots whereby said clamping means may be moved towards or away from said plate for clamping said bracket to a side of the vehicle side.

2. A tie-down assembly as claimed in claim 1 wherein said clamping means comprising a pair of spaced right angled members having bores at their upper ends, a spacing tube secured between said members and in alignment with said bores therein, a bolt in said tube and extending into said bores for sliding engagement with said slots in said side walls, a reinforcing block having a central threaded bore secured to the lower ends of said angle members, a handle threadably engaged in said reinforcing block and a centrally bored clamp detachably secured to the upper end of said handle.

3. A tie-down assembly for the securement of side-by-side arranged containers on the bed of a vehicle having sides including in combination, a pair of spaced, opposite-hand bracket assemblies detachably secured on each side of the vehicle and opposite ends of each container, there being a pair of spaced, bored lugs on each end of said container and a pair of ears on each said bracket, and a frame assembly pivotally connected at one of its ends to said lugs on a container and at its end to said ears on said bracket, whereby said containers may be shifted from side to side on said bed to provide clearance between a side of said vehicle and said containers; said frame comprising a unitary, substantially A-shaped weldment, said weldment including a pair of diagonal tubes, a horizontal tube connected to said diagonal tubes and a vertical tube fixed to the ends of said diagonal tubes, a yoke having a pair of inwardly extending, bored ears for rotatable connection to said lugs on said containers, said yoke being rotatably received in the upper ends of said diagonal tubes and a pin having a bored end adapted to be slidably mounted in each vertical tube for pivotal attachment to said ears on said bracket.

References Cited by the Examiner

UNITED STATES PATENTS

| | | | |
|---|---|---|---|
| 1,242,617 | 10/1917 | Souther | 105—368 X |
| 1,433,261 | 10/1922 | Copony | 105—368 |
| 1,766,289 | 6/1930 | Doud et al. | 105—368 |
| 1,850,597 | 3/1932 | McGuire | 105—367 |
| 2,060,059 | 11/1936 | Evans | 105—368 |

ARTHUR L. LA POINT, *Primary Examiner.*

DRAYTON E. HOFFMAN, *Examiner.*